May 18, 1965 J. C. MARINACE 3,184,348

METHOD FOR CONTROLLING DOPING IN VAPOR-GROWN SEMICONDUCTOR BODIES

Filed Dec. 30, 1960

INVENTOR
JOHN C. MARINACE

BY John F. Ohlandt Jr.
ATTORNEY 3,184,348
Patented May 18, 1965

3,184,348

METHOD FOR CONTROLLING DOPING IN VAPOR-GROWN SEMICONDUCTOR BODIES

John C. Marinace, Yorktown Heights, N.Y., assignor to International Business Machines Corporation, New York, N.Y., a corporation of New York Filed Dec. 30, 1960, Ser. No. 79,896
2 Claims. (Cl. 148—174)

This invention relates to the art of vapor growth of semiconductor bodies suitable for use in signal translating devices and more particularly to a technique, and to apparatus employable therewith, for achieving plural junction devices in which the junctions formed between regions of the devices are abrupt.

The art of vapor growth embraces a number of processes which depend on essentially different reactions but which have in common the deposition of semiconductor material from the vapor phase onto a substrate. The present invention is particularly applicable to one of these processes which shall be designated the halide disproportionation process. In this process a semiconductor source material is combined with a halogen transport element in one temperature zone so as to form a vaporous compound and the compound so formed is decomposed in a second temperature zone thereby freeing the semiconductor material which deposits epitaxially and forms a layer on a substrate provided in the second zone. However, the present invention is also applicable to processes which, for example, use the pyrolytic decomposition or hydrogen reduction of such substances as $GeCl_4$, $SiHCl_3$, $SiCl_4$, which substances are separately prepared prior to initiation of the reaction.

The halide disproportionation process referred to above is practiced in either an open tube type of system or a closed tube type. In the case of the closed tube system, in general, doping of only one type can be simply effected. In the case of the open tube system, wherein a flow of carrier gas, such as hydrogen is utilized, the doping can be either of N or P conductivity-type. For example, in the open tube system, after deposition of an N-type region has been made on a substrate, an acceptor impurity may then be introduced into the reaction tube or container, whereby, depending upon the proportion of that impurity, the next region of the deposited semiconductor material will be of reduced N conductivity-type or even of P conductivity-type. However, such a scheme is practically ineffective when it is desired to obtain sharp transitions between different deposited regions in order that the device as finally fabricated will contain abrupt junctions.

Accordingly, it is an object of the present invention to provide the capability of a rapid transition in the vapor growth technique from one type of deposition to another type.

Another object is to attain with a very simple technique plural junction devices wherein the junctions, formed between contiguous layers of the devices are abrupt and wherein some layers are very thin.

The above objects are achieved in accordance with a broad feature of the present invention involving a technique wherein an open tube system of special configuration is employed and wherein the separate reactions which will produce the desired individual depositions are efficiently and integrally combined. A more specific feature of the present invention resides in a technique whereby the substrate may be positioned selectively in desired portions of the reaction container so that successive layers or regions may be readily built up to any desired thickness and the changeover from the deposition of one layer to the deposition of another may be easily and rapidly effected.

The foregoing and other objects, features and advantages of the invention will be apparent from the following more particular description of a preferred embodiment of the invention, as illustrated in the accompanying drawings.

In the following description of a preferred embodiment of the present invention, certain specific materials and temperatures will be referred to. However, these specific references are not to be construed as limiting.

Figure 1:
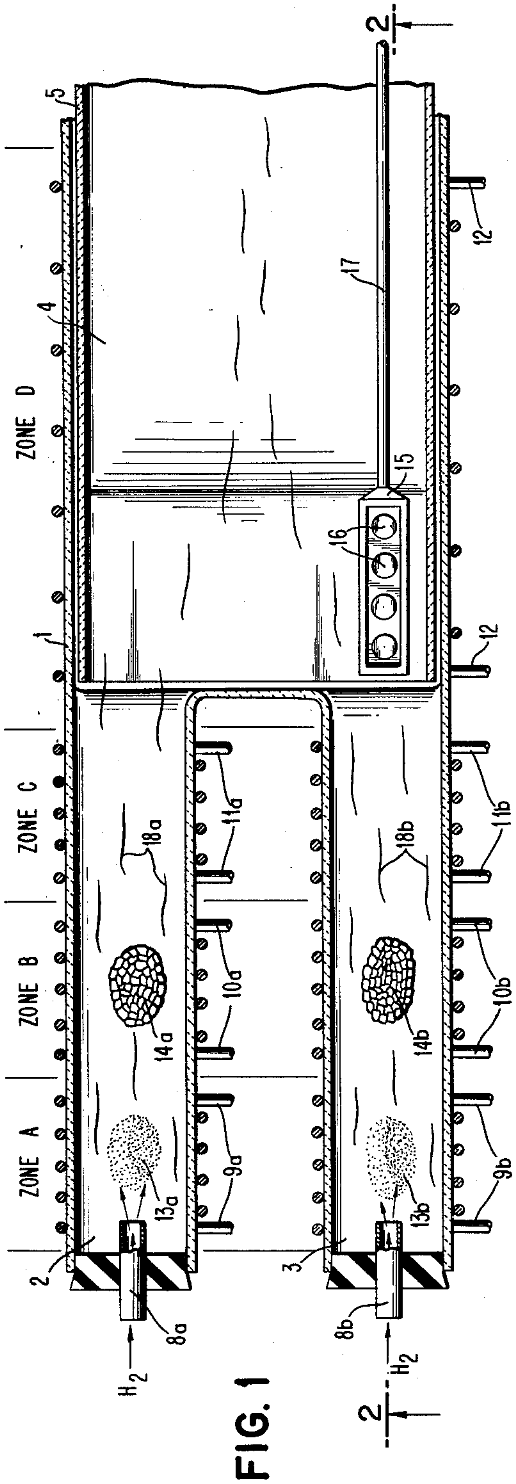
FIG. 1 is a top view in section of the reaction apparatus to be utilized with the technique of the present invention.
Figure 2:
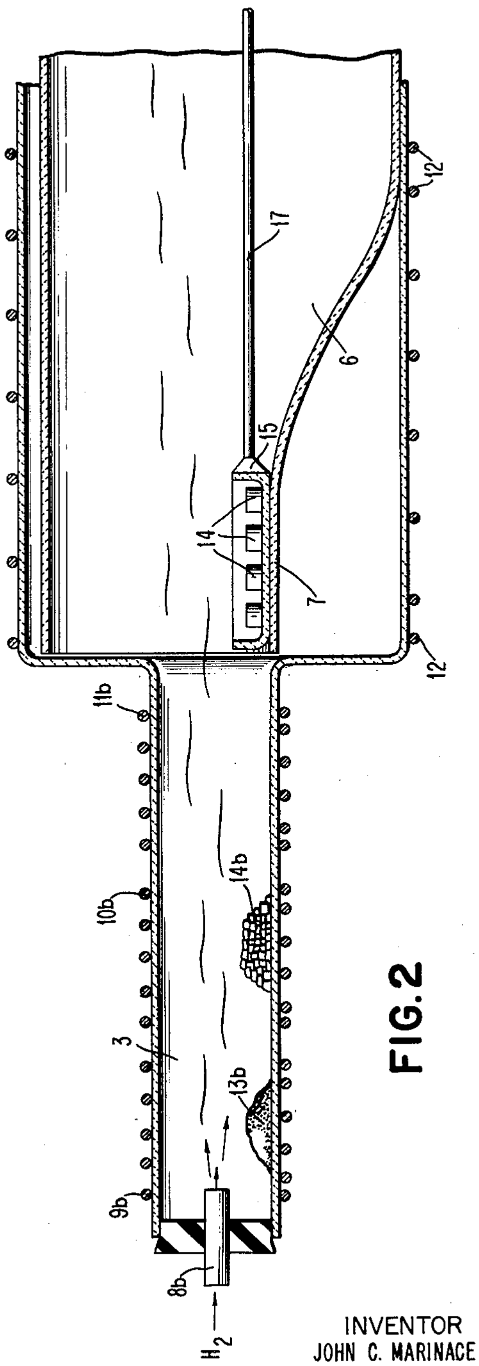
FIG. 2 is a side view in section of the reaction apparatus.

Referring now to FIG. 1, the apparatus therein illustrated comprises a reaction container or furnace of quartz, generally designated by reference numeral 1. The container is divided at one end thereof into two branches 2 and 3, each for purposes to be explained hereinafter, and the branches are joined in a common portion 4 at the other end of the container. Positioned inside the common portion 4 is a quartz liner 5 having a bent section 6, the end of the bent section serving as a platform 7. Sealed to and extending into each of the branches are inlet tubes *8a* and *8b* through which a suitable non-oxidizing carrier gas such as hydrogen is introduced into the container 1. The carrier gas is passed out of a container from the common portion 4 to a suitable exhaust hood not shown.

Disposed about the container 1 are resistance windings 9*a*, 9*b*, 10*a*, 10*b*, 11*a*, 11*b* and 12, connected to a source of power, not shown, which windings serve as heating elements to provide the necessary temperature profile. Typically, this profile may involve a temperature of 70° in zone A, 600° in zone B, 400° in zone C and 500° in zone D.

Within each of the branches 2 and 3 of the container 1 there is disposed a quantity of iodine labelled 13*a* and 13*b* respectively, and a mass of a semiconductor source material, labelled 14*a* and 14*b* respectively, such as germanium. Included within the mass of semiconductor material situated in one of the branches is a suitable impurity agent or dopant such as gallium and in the other branch the mass contains a suitable donor impurity. In the common portion 4 there is situated upon the platform 7 a holder 15 on which are disposed semiconductor wafers 16 of germanium. Attached to the holder is a rod 17 for easy manipulation of the holder.

In accordance with the technique of the present invention, with the flow of hydrogen gas as illustrated and with the temperature profile as hereinbefore specified, two streams of gaseous mixtures 18*a* and 18*b* are created. The iodine vapor produced in zone A is carried by the flow of hydrogen into zone B where in each of the branches of that zone the iodine reacts with the respective source materials to produce a vaporous semiconductor compound. The vaporous semiconductor compounds are swept from zone B to zone C where in each of the branches of that zone decomposition of the vaporous compounds takes place so that the semiconductor source material is freed and another vaporous compound created. This latter compound is swept into zone D and thence out of the container. For the particular embodiment illustrated, germanium diiodide is the reaction product in zone B of each branch. This vaporous compound is decomposed by the disproportionation reaction whereby free germanium is produced in zone C as well as germanium tetraiodide.

When deposition of a first conductivity type is desired, the substrate holder 15 is moved from its position on platform 7 into zone C of one of the branches and the freed semiconductor material produced in that branch deposits epitaxially on the substrates. When deposition of another conductivity type is desired, the substrate holder is moved quickly from its position in zone C of one of the branches along the platform 7 and into the corresponding zone in the branch associated with the second conductivity type. Thus, a rapid transition may be effected between the depositions of desired types of successive regions with the result that abrupt junctions will exist between the deposited regions. Thus it may be seen that changing from one conductivity type to another need not depend upon establishing a new chemical or even thermal equilibrium.

Although the technique of the present invention has been illustrated in one embodiment as involving the use of germanium, it will be understood that other semiconductor materials can likewise be advantageously employed. Also, it will be apparent that a greater number of separate reaction branches may be provided in the container so that a wider choice will be available in forming contiguous layers.

While the invention has been particularly shown and described with reference to a preferred embodiment thereof, it will be understood by those skilled in the art that various changes in the form and details may be made therein without departing from the spirit and scope of the invention.

What is claimed is:

1. The method of producing semiconductor devices having a plurality of layers of semiconductor material with abrupt junctions therebetween which comprises, positioning a first source of semiconductor material with a suitable doping material and a transport element in a first temperature zone of one branch of a reaction container, positioning a second source of semiconductor material with a doping material that will produce a different degree or opposite type of doping and a transport element in a first temperature zone of a second branch of said reaction container; reacting each of said sources and respective transport elements so as to produce vaporous compounds; decomposing each of said vaporous compounds in a separate, second temperature, zone of each of said branches, thereby freeing said first and second sources of semiconductor material; producing a flow of carrier gas through each of said branches and into a third temperature zone to which said first and second branches are joined; and successively positioning a substrate in each of the separate second zones of each of said branches so as to deposit semiconductor material selectively thereon to produce a plurality of layers of differing conductivity.

2. The method as defined in claim 1 wherein said first and second sources of semiconductor material comprise germanium of opposite conductivity types, and wherein said transport element in each branch is iodine.

References Cited by the Examiner

UNITED STATES PATENTS

| | | | |
|---|---|---|---|
| 2,692,839 | 10/54 | Christensen et al. | 118—48 X |
| 2,763,581 | 9/56 | Freedman | 148—1.5 |
| 2,809,135 | 10/57 | Koury | 148—1.5 |
| 3,089,788 | 5/63 | Marinace | 148—175 X |

FOREIGN PATENTS

| | | |
|---|---|---|
| 1,029,941 | 5/58 | Germany. |
| 1,046,781 | 12/58 | Germany. |

DAVID L. RECK, *Primary Examiner.*

MARCUS U. LYONS, *Examiner.*